United States Patent
Lee

(10) Patent No.: US 10,086,733 B2
(45) Date of Patent: Oct. 2, 2018

(54) STRUCTURE OF SEATBACK HANDLE

(71) Applicant: Hyundai Motor Company, Seoul (KR)

(72) Inventor: Kyoung-A Lee, Jeonju-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/366,988

(22) Filed: Dec. 1, 2016

(65) Prior Publication Data

US 2018/0056837 A1    Mar. 1, 2018

(30) Foreign Application Priority Data

Sep. 1, 2016 (KR) .................. 10-2016-0112470

(51) Int. Cl.
*B60N 3/02* (2006.01)
*H02J 7/00* (2006.01)
*B60N 3/00* (2006.01)
*B60R 11/00* (2006.01)

(52) U.S. Cl.
CPC ............. *B60N 3/02* (2013.01); *B60N 3/00* (2013.01); *H02J 7/0045* (2013.01); *B60R 2011/0015* (2013.01); *B60R 2011/0075* (2013.01)

(58) Field of Classification Search
CPC .......... B60N 3/02; B60N 3/026; B60N 3/023; B60R 2011/0015; B60R 2011/0075; B60R 2011/0094; B60R 11/0252
USPC .................. 297/183.6, 183.7, 217.3
See application file for complete search history.

(56) References Cited

U.S. PATENT DOCUMENTS

| | | | | |
|---|---|---|---|---|
| 3,951,454 A | * | 4/1976 | Tantlinger | A47C 7/185 297/183.7 |
| 6,113,189 A | * | 9/2000 | Bennett | A61G 5/1067 297/183.7 |
| 2001/0011836 A1 | * | 8/2001 | Grey | B60N 2/002 296/214 |
| 2003/0013504 A1 | * | 1/2003 | Park | B60N 3/02 455/569.2 |
| 2003/0111880 A1 | * | 6/2003 | Lambiaso | B64D 11/06 297/217.3 |
| 2005/0006917 A1 | * | 1/2005 | Sparks | B60N 2/0228 296/1.02 |
| 2007/0257499 A1 | * | 11/2007 | Lipke | B60N 3/023 296/1.08 |
| 2008/0222854 A1 | * | 9/2008 | Keyaki | A44B 19/26 24/429 |
| 2012/0193383 A1 | * | 8/2012 | Ludwig | B60N 3/023 224/539 |

(Continued)

FOREIGN PATENT DOCUMENTS

| | | |
|---|---|---|
| CN | 203005168 U | 6/2013 |
| JP | 2002-127802 A | 5/2002 |
| KR | 10-1330047 B1 | 11/2013 |

*Primary Examiner* — Timothy J Brindley
(74) *Attorney, Agent, or Firm* — Morgan, Lewis & Bockius LLP

(57) ABSTRACT

A structure of a seatback handle mounted at a seatback of a seat for the vehicle may include a module unit fixedly mounted at the seatback, the module unit exposing a charger terminal at a first side thereof, and a cover unit spaced from the module unit to be fixed at the seatback, wherein the charger terminal is electrically connected to an electrical device of the vehicle to supply power when the charger terminal is connected to a charging cable, and the cover unit may have a slidable part to cover or expose the charger terminal.

5 Claims, 8 Drawing Sheets

(56) References Cited

U.S. PATENT DOCUMENTS

| | | | | |
|---|---|---|---|---|
| 2013/0264851 A1* | 10/2013 | Kim | ......................... | B60R 16/03 |
| | | | | 297/217.3 |
| 2014/0077539 A1* | 3/2014 | Brawner | ................. | B60R 11/02 |
| | | | | 297/217.3 |
| 2016/0075265 A1* | 3/2016 | Claire | ...................... | B60N 3/02 |
| | | | | 296/1.02 |

* cited by examiner

FIG. 4
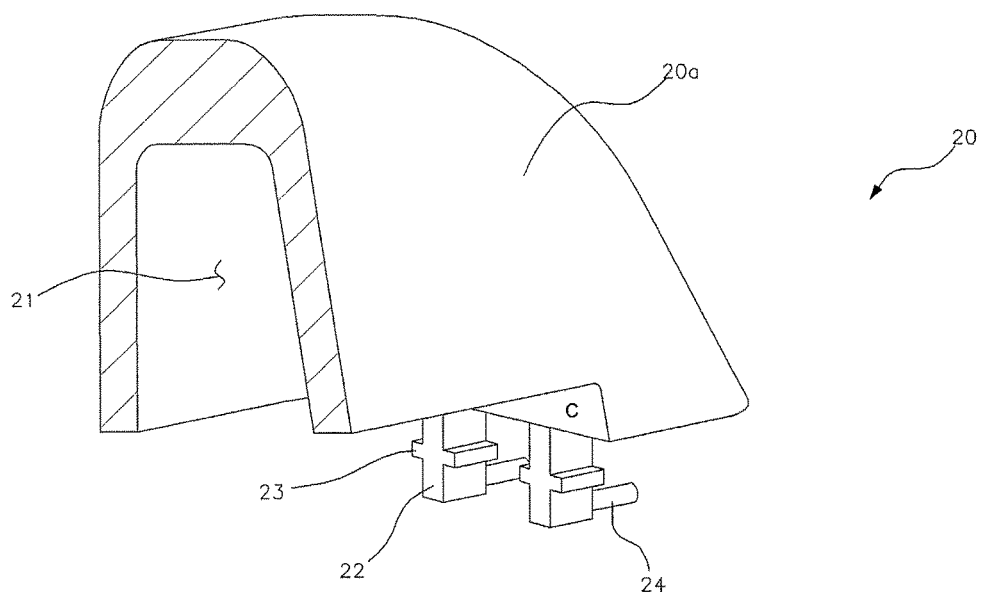
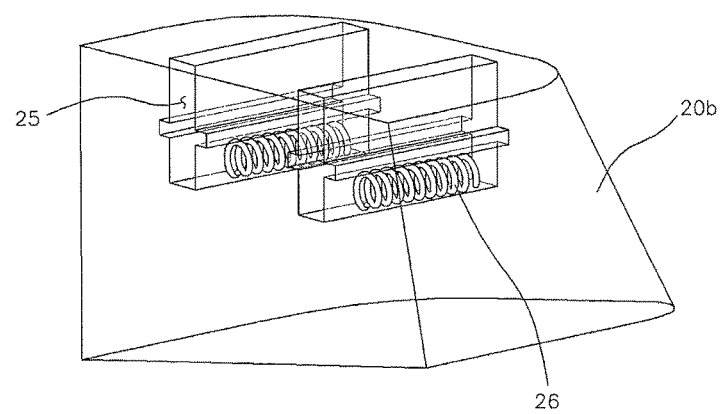

FIG. 6
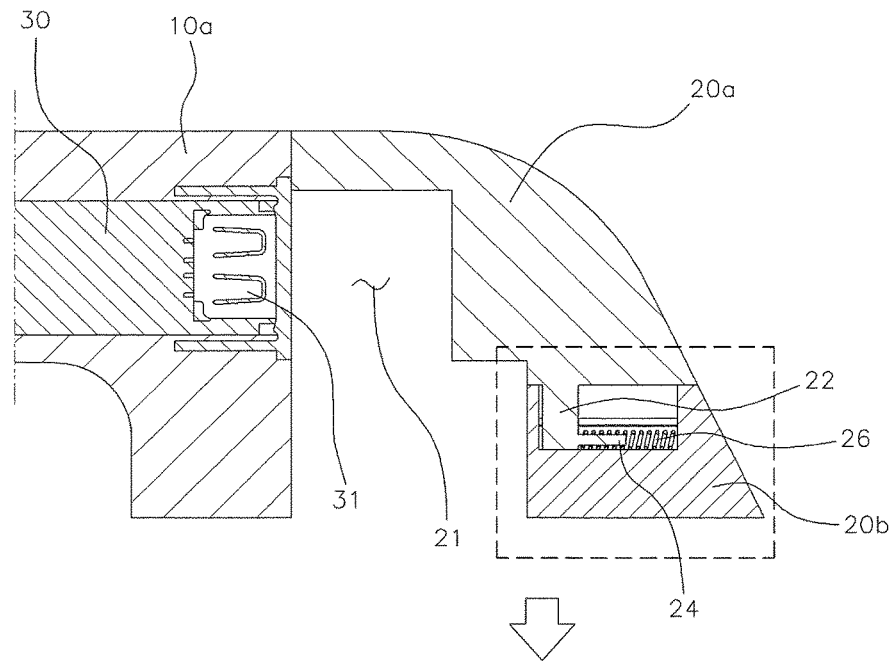
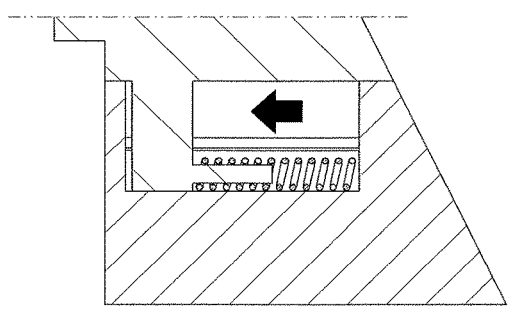
< Covering Charger Terminal >
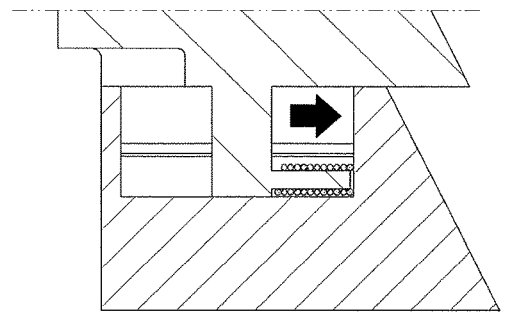
< Exposing Charger Terminal >

FIG. 8
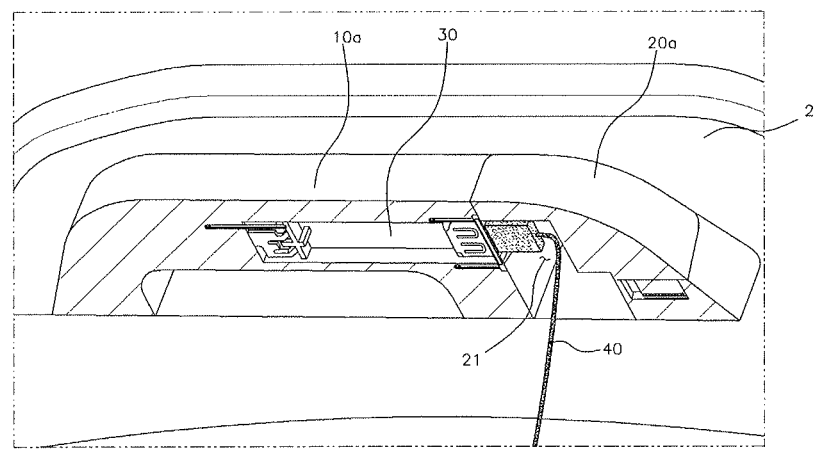
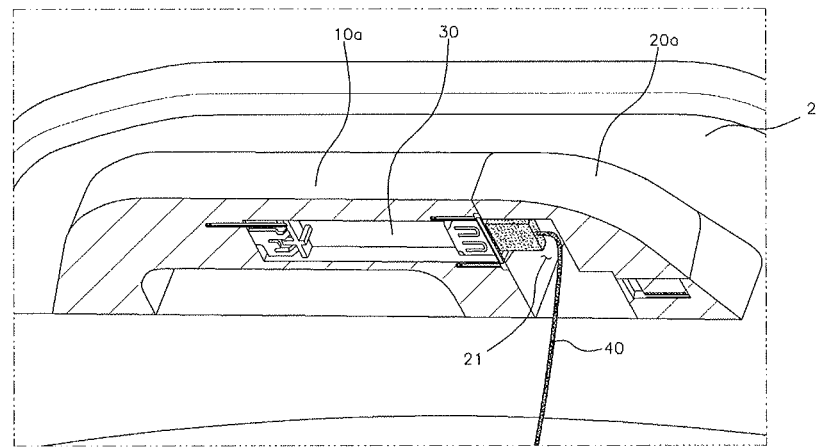

STRUCTURE OF SEATBACK HANDLE

CROSS-REFERENCE TO RELATED APPLICATION

The present application claims the priority benefit of Korean Patent Application No. 10-2016-0112470, filed on Sep. 1, 2016, the entire contents of which is incorporated herein for all purposes by this reference.

BACKGROUND OF THE INVENTION

Field of the Invention

The present invention relates to a structure of a handle mounted at a seatback (a rear part of a seat), and more particularly, to a structure of a seatback handle configured for providing a charging function of portable devices while providing a conventional handle function.

Description of Related Art

As illustrated in FIG. 1, a handle 3 is mounted at a seatback 2 of a bus seat 1 such that it is convenient to sit down or sit up for a passenger who sits on a rear seat.

Both ends of the handle 3 are bent to have a bar shape. In addition, both ends of the handle 3 are coupled to the seatback 2 through a bolt fastened method.

Meanwhile, recently, most people carry a portable device such as a smartphone. Additionally, charging the portable device in a vehicle is common.

However, it is difficult to personally charge the portable device of the passenger in the bus unlike a private car. Accordingly, discharging the portable device frequently occurs in the case of long distance travel.

To this end, a bus in which a charger terminal capable of charging a portable device is mounted at the seatback 2 or an armrest of the seat as a convenient device has been developed.

However, conventionally, since charger terminals are different according to shapes of the seats, one charger terminal is only used one kind of bus not the other kinds of buses (it is difficult to universalize components). In addition, since the charger terminals are mounted to be exposed, the charger terminals may be easily broken due to introduction of foreign substances. In this case, although a separate cap covers the charger terminal, it may be easy to lose the cap due to common use.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a seatback handle configured for integrating a charger terminal and a handle to use the charger terminal in common, and fundamentally preventing introduction of foreign substances by covering the charger terminal (not being exposed) when not in use.

Technical objects to be achieved by the present invention are not limited to those mentioned above, and other objects may be clearly understood by those skilled in the art from the description given below.

In accordance with the present invention, the above and other objects can be accomplished by the provision of a structure of a seatback handle mounted at a seatback of a seat for the vehicle including a module unit fixedly mounted at the seatback, the module unit exposing a charger terminal at a first side thereof, and a cover unit spaced from the module unit to be fixed at the seatback, wherein the charger terminal is electrically connected to an electrical device of the vehicle to supply power when the charger terminal is connected to a charging cable, and the cover unit may have a slidable part to cover or expose the charger terminal.

The module part may include a body having a linear bar shape and a support formed by bending both ends of the body to be fixed at the seatback, and the cover unit may be disposed to have a shape expanding from the body when the cover unit covers the charger terminal.

The cover unit may include a fixer fixed at the seatback, the fixer at which a sliding groove is formed and a slider at which a protrusion inserted into the sliding groove is formed, and the slider may be movable along the sliding groove while the protrusion is inserted into the sliding groove.

The protrusion may include a step vertically protruding at a part inserted into the sliding groove, and the sliding groove may be formed to prevent the protrusion from being separated from the sliding groove.

The sliding groove may be mounted with a spring pressing the slider such that the slider is disposed to cover the charger terminal.

When the slider covers the charger terminal, the slider may have an open part such that a part of a charging cable connected to the charger terminal may poke out of the slider.

When the seatback is inclined at a predetermined angle, a first side of the fixer may be disposed to be higher than a second side of the fixer to form an inclined interface between the fixer and the slider to be vertically disposed at the ground.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a view illustrating an inner part of a fixer of a cover unit, in a state that the fixer and a slider of the cover unit are disassembled, by seeing through the fixer;

FIG. 6 is a cross-sectional view illustrating an A-A part of FIG. 2 and the slider in a sliding state;

FIG. 8 is a cross-sectional view clearly illustrating the seatback handle taken along a horizontal direction in which the charger terminal is connected to the charging cable when covering the charger terminal.

Figure 1:
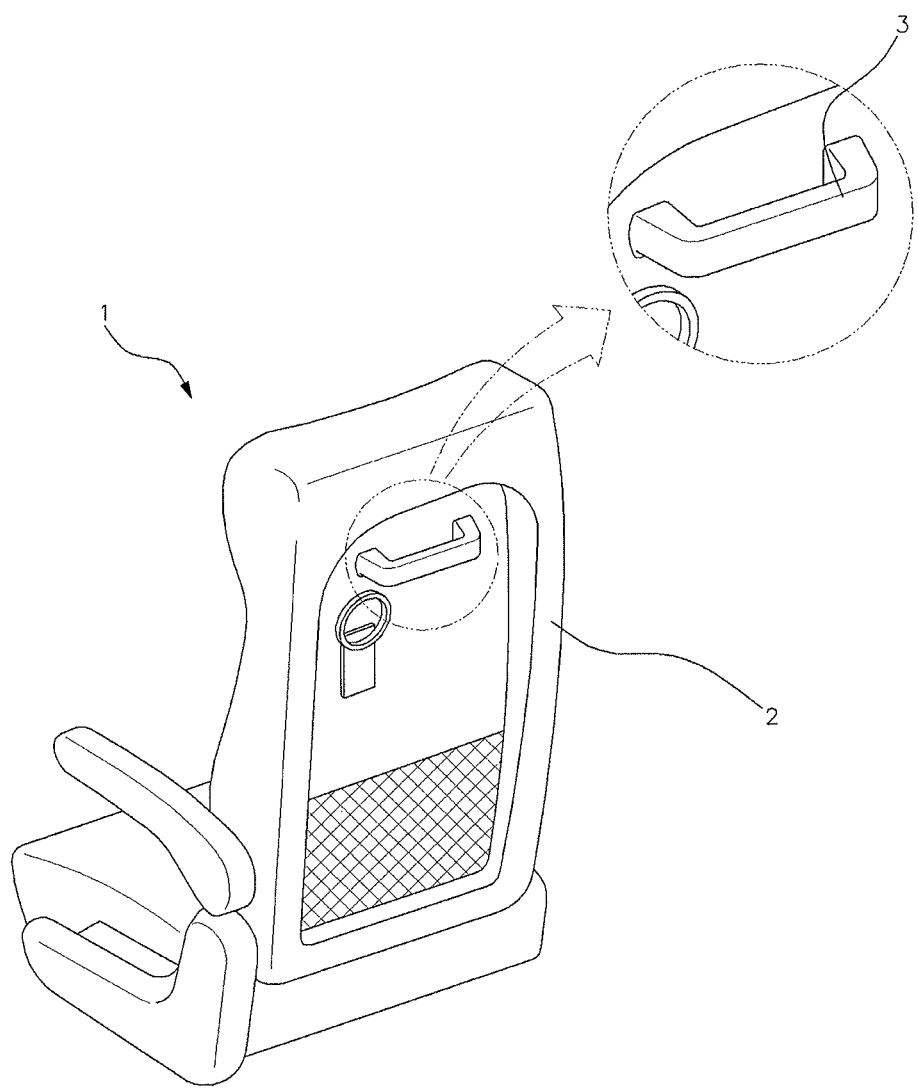
FIG. 1 is a perspective view of a seat mounted with a conventional seatback handle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternates, modifications, equivalents and other embodiments, which may be included within the spirit and scope of the invention as defined by the appended claims.

Hereinafter, the present invention will be described in detail with reference to the accompanying drawings to allow those skilled in the art to practice the present invention. However, the present invention may be embodied in many different forms and is not limited to embodiments described herein.

In the drawings, to clearly describe the present invention, parts extrinsic to the description are not illustrated, and the same or similar elements are denoted by the same reference numerals even though they are depicted in different drawings.

In addition, the terms or words used in the specification and claims of the present invention are not interpreted using typical or dictionary limited meanings, and are constructed as meanings and concepts conforming to the technical sprit of the present invention based on the principle that the inventors can appropriately define the concepts of the terms to explain the present invention in the best manner.

Figure 2:
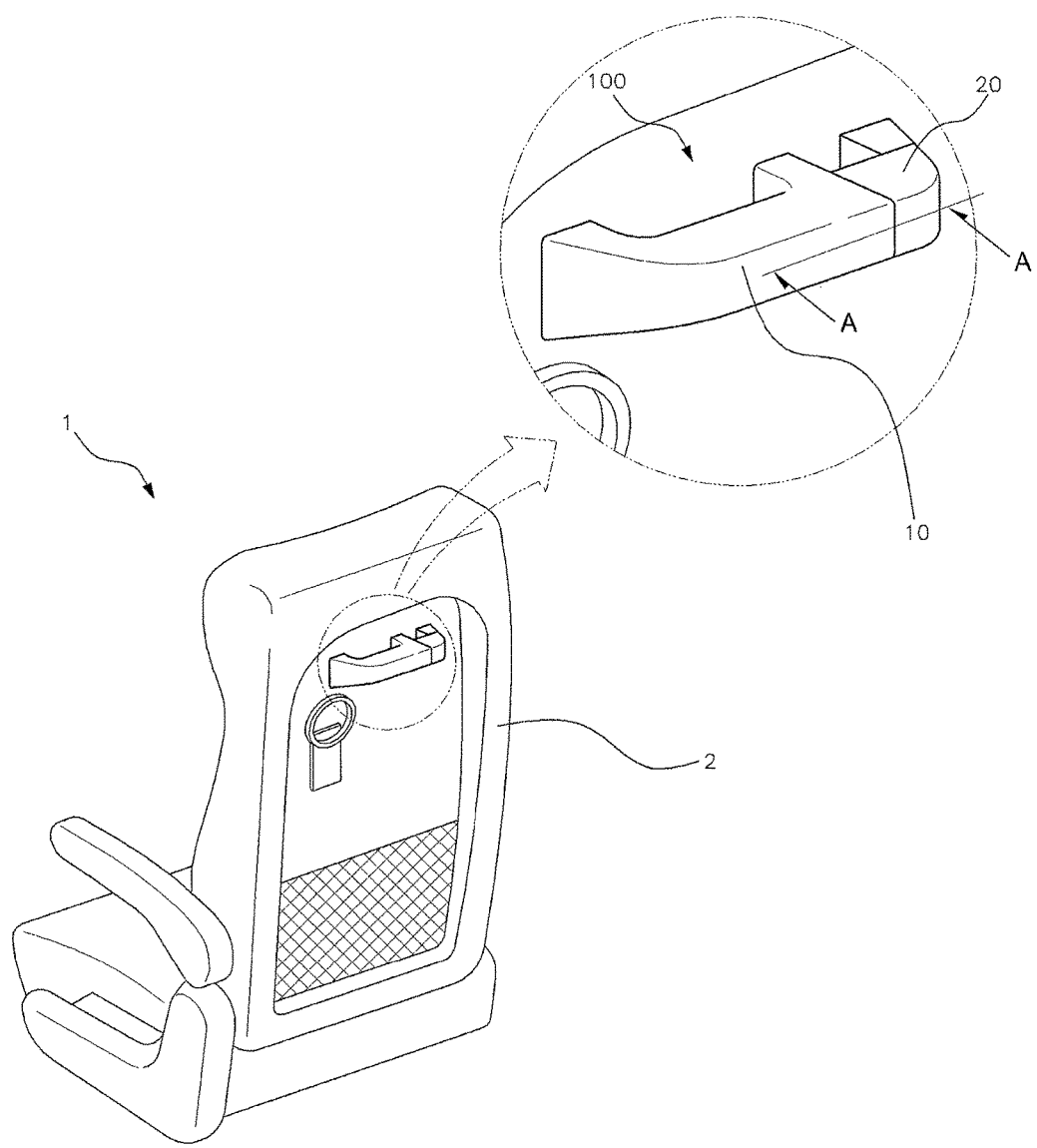
FIG. 2 is a perspective view of a seat mounted with a seatback handle according to an embodiment of the present invention.
Figure 3:
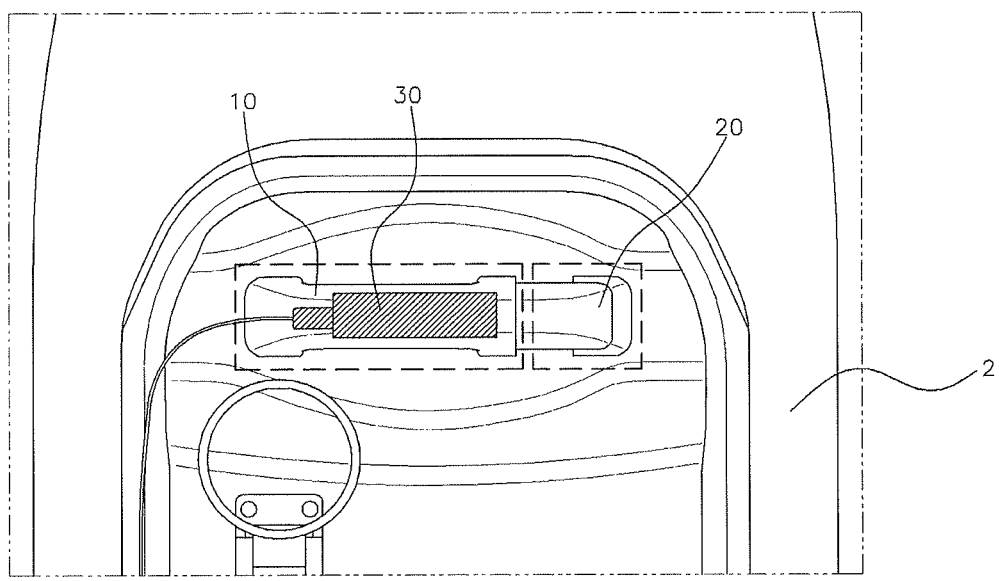
FIG. 3 is a view illustrating a charging module by seeing through a module unit.
Figure 7:
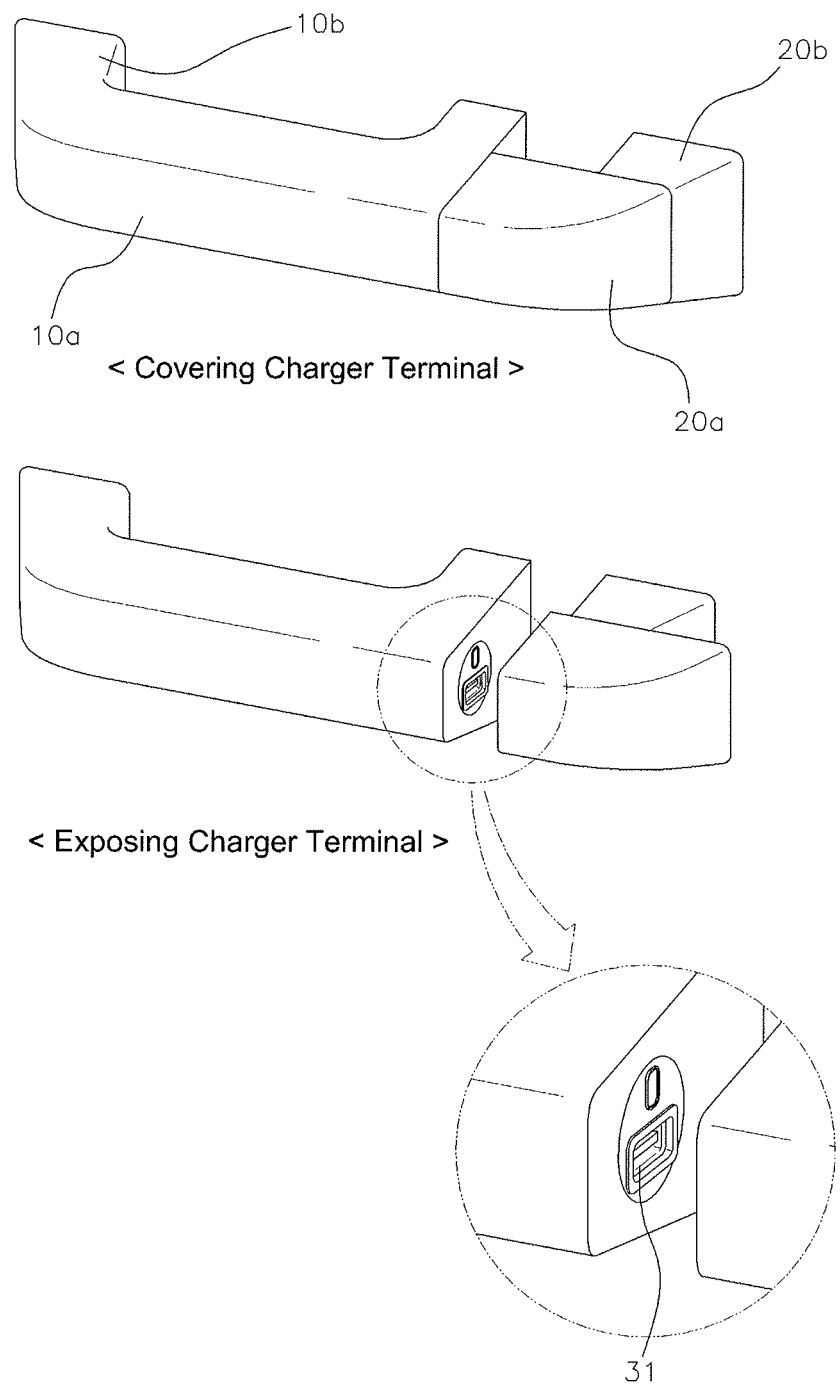
FIG. 7 is a view illustrating the charger terminal in a covered state or in an exposed state.

The present invention relates to a seatback handle mounted at a seatback of a seat for vehicle such as a bus or a private car. Hereinafter, the present invention will be described in detail with reference to the accompanying drawings Referring to FIG. 2, a seatback handle, which is designated by reference numeral "100", includes a module unit 10 and a cover unit 20 according to the illustrated embodiment of the present. As illustrated in FIG. 3, the module unit 10 is mounted at the seatback 2 while a charging module 30 is embedding therein. A charger terminal 31 is formed at the charging module 30 to be exposed by a first side of the charging module 30 (see FIG. 7). The charging module 30 is electrically connected to an electrical device (a battery, etc.) of the vehicle to supply power when a charging cable 40 is connected to the charging module 30. The module unit 10 includes a body 10a having a linear bar similar to a conventional handle and supports 10b. Both ends of the body 10a are bent to form the supports 10b while the supports 10b are fixed at the seatback 2.

The cover unit 20 is fixed at the seatback 2 while being spaced from the module unit 10. The cover unit 20 is slidably mounted to cover or expose the charger terminal 31. When the charger terminal 31 is covered, the cover unit 20 is disposed to have a shape extending from the body 10a.

According to the embodiment, FIG. 4 illustrates the exploded cover unit 20. Referring to FIG. 4, the cover unit 20 is fixed at the seatback 2. The cover unit 20 includes a fixer 20b at which a slide groove 25 is formed (being formed in a horizontal direction and having an opened upper surface) while being fixed at the seatback 2 and a slider 20a at which a protrusion 22 inserted into the sliding groove 25 is formed.

The slider 20a is provided to be movable along the slide groove 25 in the state that the protrusion 22 is inserted into the slide groove 25. The protrusion 22 includes a step 23 vertically formed at a part inserted into the slide groove 25 to have a "+" shape, thereby preventing the protrusion 22 from being separated from the slide groove 25.

In addition, a spring 26 pressing the slider 20a is mounted in the slide groove 25 to apply elastic force such that the slider 20a is disposed to cover the charger terminal 31 (see FIG. 6). A circular bar 24 is formed at the protrusion 22 while having a coil shape to be inserted into the spring 26.

In addition, a space 21 is formed in the slider 20a to have a predetermined size. The slider 20a may have a concave surface contacting the fixer 20b. A part C of a lower end of the slider 20a is opened. Accordingly, although the slider 20a is disposed to cover the charger terminal 31 by elastic force of the spring 26 after connecting a part of the charging cable 40 to the charger terminal 31, a second part of the charging cable 40 may poke out of the slider 20a (see FIG. 8).

Figure 5:
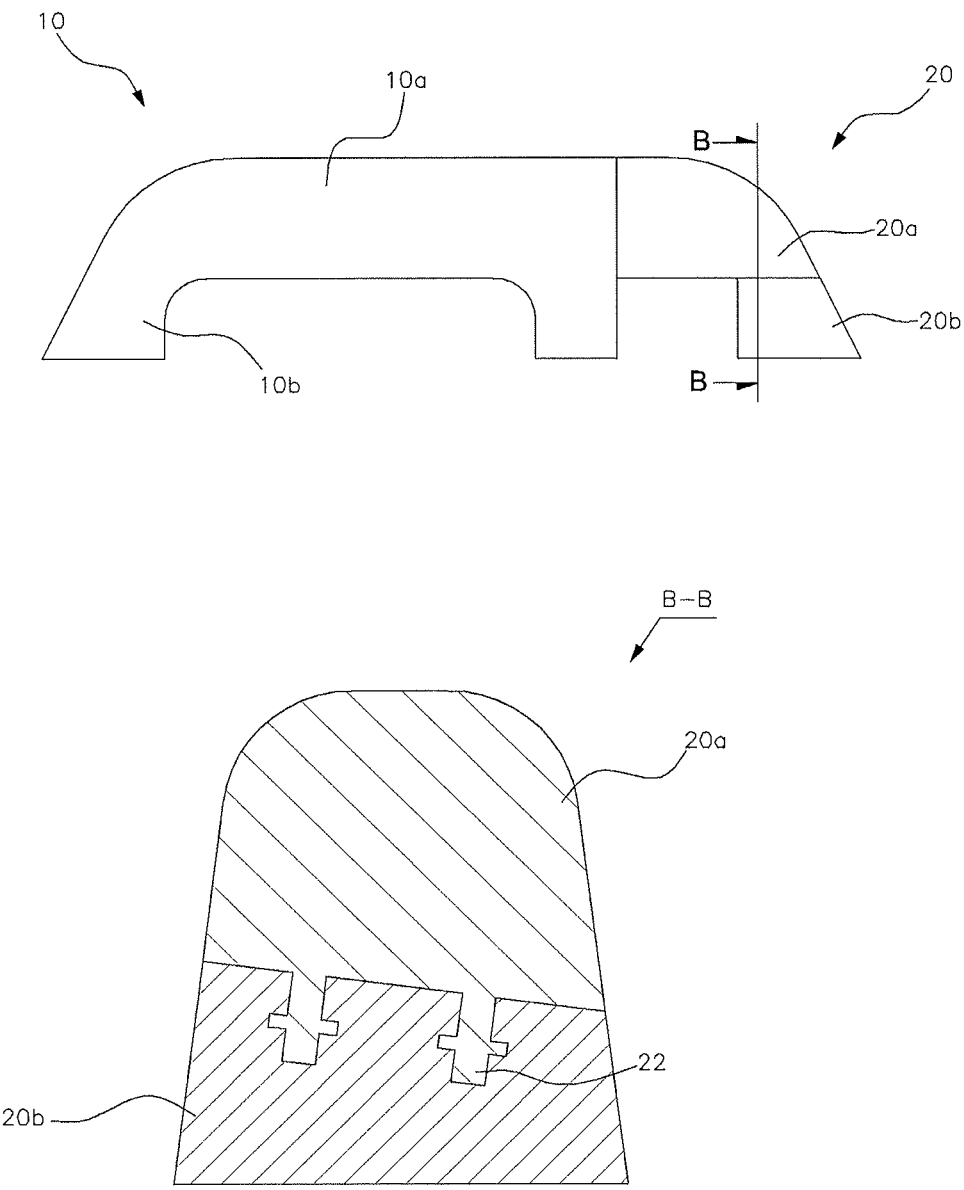
FIG. 5 is a cross-sectional view illustrating an entire seatback handle and a B-B part.

As clearly illustrated in the cross-sectional view of FIG. 5, an interface between the fixer 20b and the slider 20a is tilted (a first side of the fixer is formed to be higher than a second side thereof) considering that the seatback 2 is mounted at the seat to be inclined at a predetermined angle, like a mounting manner of the conventional seat. Accordingly, the interface between the fixer 20b and the slider 20a is vertically disposed at the ground. Accordingly, dispersion of force for sliding the slider 20a may be prevented.

The charger terminal 31 is mounted at the module unit 10 to function as the handle such that components are used in common (configured for being applied to seats having different specifications). Additionally, the charger terminal 31 is only exposed when in use, thereby preventing introduction of foreign substances. Furthermore, as illustrated in FIG. 6, the slider 20a of the cover unit 20 is disposed to cover the charger terminal 31 by elastic force of the spring 26 and, as such, the charger terminal 31 is maintained in a covered state without additional operation of the user.

Additionally, the space 21 is formed at the slider 20a and the part C of the slider 20a is open such that the charger terminal 31 may prevent the charging cable 40 from interfering with the slider 20a when the slider 20a is disposed to cover the charger terminal 31.

As apparent from the above description, in accordance with the present invention, the charger terminal is mounted at the module unit for functioning as the handle such that components are used in common. Additionally, the charger terminal is only exposed upon using the charger terminal, thereby preventing introduction of the foreign substances.

The slider of the cover unit is disposed to cover the charger terminal by elastic force of the spring and, as such, the charger terminal is maintained in a covered state without an additional operation of a user.

In addition, a part of the slider is opened (forming the space) such that the charger terminal may prevent the charging cable from interfering with the slider although the slider is disposed to cover the charger terminal.

Furthermore, (like a mounting method of the conventional seat) the interface between the fixer and the slider is inclined, considering that the seatback is mounted at the seat to be inclined at a predetermined angle. Accordingly, the interface between the fixer and the slider is vertically disposed at the ground. Accordingly, dispersion of force for sliding the slider may be prevented.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure of a seatback handle mounted at a seatback of a seat for a vehicle comprising:
   a module unit fixedly mounted at the seatback, the module unit exposing a charger terminal at a side thereof; and
   a cover unit spaced from the module unit to be fixed at the seatback,
   wherein the charger terminal is electrically connected to an electrical device of the vehicle to supply power when the charger terminal is connected to a charging cable, and
   wherein the cover unit has:
      a fixer fixed at the seatback, wherein a sliding groove is formed on the fixer; and
      a slider to cover or expose the charger terminal, wherein a protrusion is formed on the slider and inserted into the sliding groove, and
   wherein the slider is movable along the sliding groove while the protrusion is inserted into the sliding groove, and
   wherein, when the slider covers the charger terminal, the slider has an open part such that a part of the charging cable connected to the charger terminal pokes out of the slider.

2. The structure of the seatback handle according to claim 1, wherein
   the module unit comprises a body having a linear bar shape and a support formed by bending both ends of the body to be fixed at the seatback, and
   the cover unit is disposed to have a shape expanding from the body when the cover unit covers the charger terminal.

3. The structure of the seatback handle according to claim 1, wherein
   the protrusion includes a step protruding at a part inserted into the sliding groove, wherein the step extends vertically with respect to a longitudinal axis of the protrusion, and
   the sliding groove, wherein the step of the protrusion is engaged to sliding groove to prevent the protrusion from being separated from the sliding groove.

4. The structure of the seatback handle according to claim 1, wherein the sliding groove is mounted with a spring pressing the slider such that the slider is disposed to cover the charger terminal.

5. The structure of the seatback handle according to claim 1, wherein, when the seatback is inclined at a predetermined angle, a first side of the fixer is disposed to be higher than a second side of the fixer to form an inclined interface between the fixer and the slider.

\* \* \* \* \*